United States Patent [19]

Singh et al.

[11] Patent Number: 4,647,273
[45] Date of Patent: Mar. 3, 1987

[54] HYDRAULIC TIRE CURING PRESS

[75] Inventors: Anand P. Singh, Youngstown; Gary R. Naylor, Canfield, both of Ohio

[73] Assignee: NRM Corporation, Columbiana, Ohio

[21] Appl. No.: 804,161

[22] Filed: Dec. 4, 1985

[51] Int. Cl.[4] ............................................. B29C 35/02
[52] U.S. Cl. .................................. 425/34 R; 100/193; 100/195; 100/199; 100/237; 425/35; 425/450.1
[58] Field of Search .................... 425/32, 33, 34 R, 35, 425/38, 43, 450.1; 100/193, 195, 199, 237

[56] References Cited

U.S. PATENT DOCUMENTS

| | | | |
|---|---|---|---|
| 2,343,881 | 3/1944 | Brundage | 425/34 R |
| 2,358,764 | 9/1944 | Soderquist | 425/34 R |
| 3,550,196 | 12/1970 | Gazuit | 425/38 |
| 3,564,649 | 2/1971 | Soderquist | 425/38 |
| 3,697,206 | 10/1972 | Bonazzi | 425/38 |
| 3,734,656 | 5/1973 | Balle | 425/34 R |
| 4,484,874 | 11/1984 | Okawachi | 425/34 R |

Primary Examiner—Willard E. Hoag

Attorney, Agent, or Firm—Renner, Otto, Boisselle & Lyon

[57] ABSTRACT

A hydraulic tire curing press comprises a center column and two outer columns respectively located at the apex and ends of a shallow V, and a pair of press cavities each located between the center column and a respective outer column. The press cavities each include a lower cavity part and an upper cavity part, the latter being supported by and between the center column and respective outer column for vertical movement by an in line or shallow V arrangement of actuators which raise and lower the upper cavity parts in order to open and close the press cavities. The center column, when at the front of the press, is used as a common mount for a pair of tire loaders respectively associated with press cavities. Roller guide assemblies, which maintain each upper cavity part during vertical movement thereof centered to and parallel to the respective lower cavity part, include a vertical rail on each column and plural rollers on the upper cavity part for engaging, respectively, two opposite sides and a third side of each rail.

39 Claims, 10 Drawing Figures

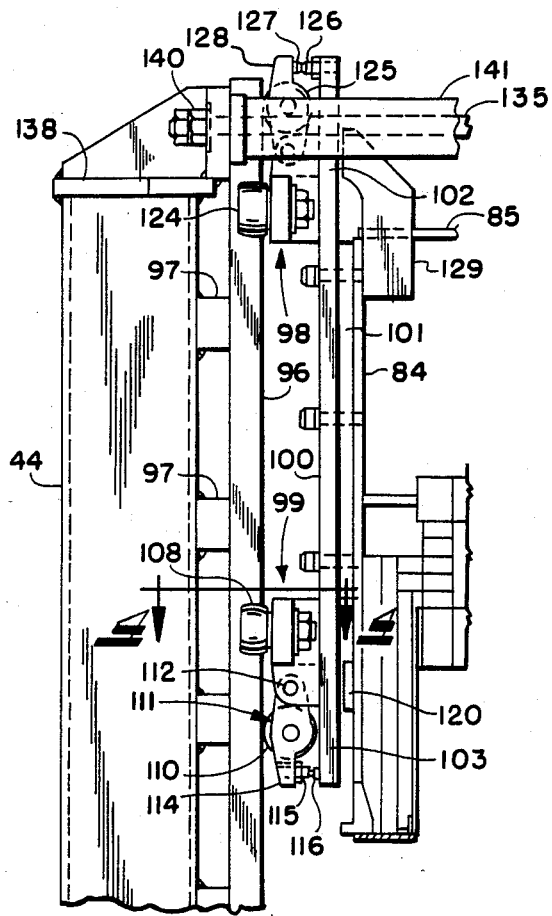
Fig. 3
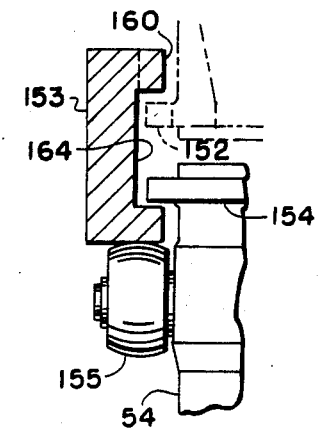
Fig. 5
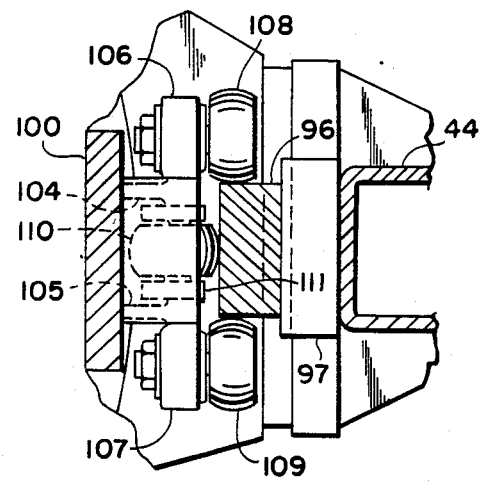
Fig. 4

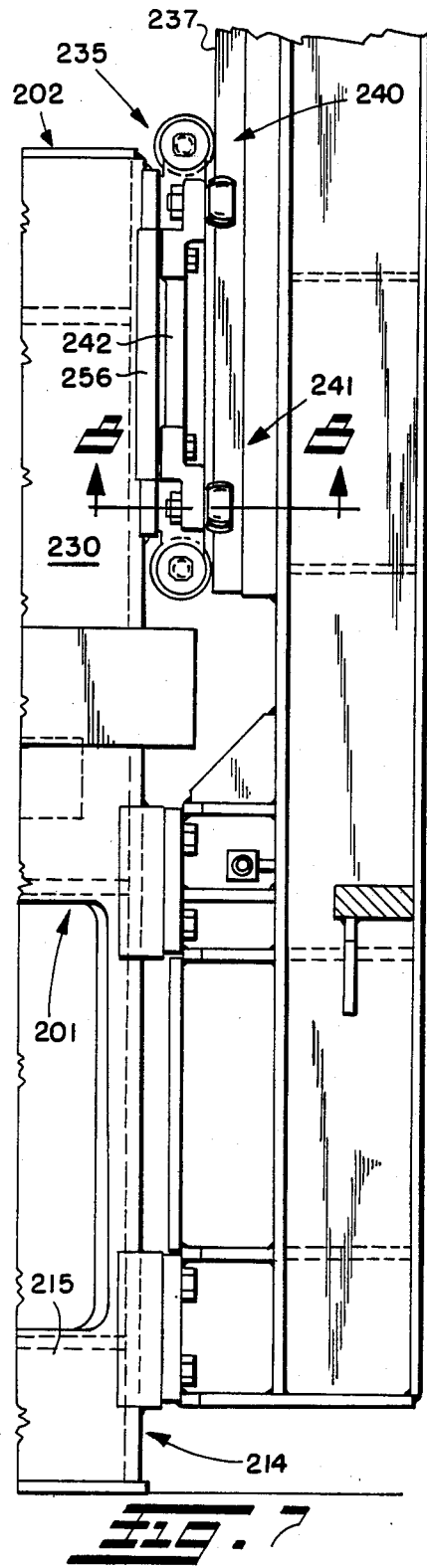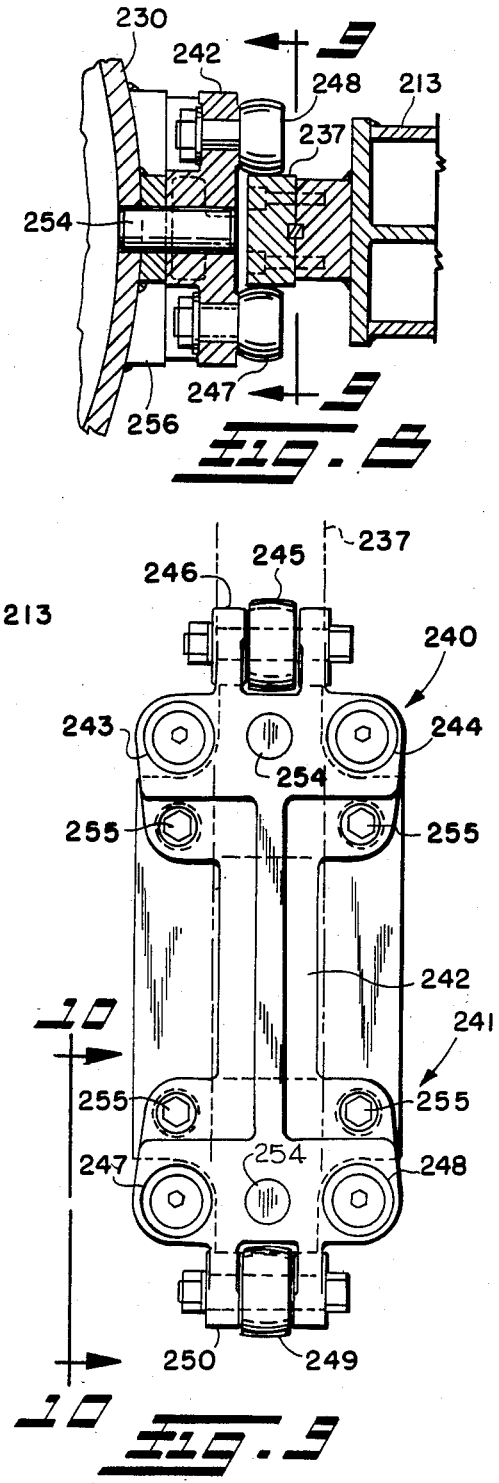

HYDRAULIC TIRE CURING PRESS

The invention herein disclosed relates generally to a tire curing press and, more particularly, to a hydraulic tire curing press.

BACKGROUND OF THE INVENTION

In the hydraulic tire curing press disclosed in Singh et al U.S. Pat. No. 4,332,536, entitled "Hydraulic Tire Press", side-by-side mold cavities each included upper and lower cavity parts for top and bottom mold sections. The upper cavity parts were supported beneath the outer ends of a relatively small shallow V-shaped beam which was mounted for movement on a single column and powered by a relatively long stroke fluid or hydraulic piston-cylinder assembly positioned in vertical alignment with the center of gravity of the upper cavity parts and beam. The lower cavity part was formed in a base with which the upper cavity part was mechanically locked by a rotating bayonet ring when the press was closed. Hydraulic clamps comprising four relatively short stroke large hydraulic piston-cylinder assemblies were positioned beneath the bottom mold section in the base and were extended to move and forceably hold the bottom mold section against the top mold section when the upper cavity part was mechanically locked to the base. An important aspect of this press was the protection of the hydraulic clamping fluid from the heat of the curing operation which overcame a problem plaguing prior attempts to develop a hydraulic press.

SUMMARY OF THE INVENTION

The present invention, as above indicated, also relates to a hydraulic tire curing press although features of the invention may have desirable application in other types of presses as well. According to one aspect of the invention, the tire curing press comprises a center column and two outer columns respectively located at the apex and ends of a shallow V, and a pair of press cavities each located between the center column and a respective outer column. The press cavities each include a lower cavity part and an upper cavity part, the latter being supported by and between the center column and respective outer column for vertical movement by a respective pair of actuators which raise and lower the upper cavity parts in order to open and close the press cavities.

In one embodiment of the invention, the outer columns are rearwardly offset from the plane through the axes of the press cavities whereas the center column is forwardly offset from such plane. The center column at the front of the press than may be used as a common mount for a pair of tire loaders respectively associated with the press cavities. The actuators for each press cavity in such embodiment are located at opposite ends of a diameter of the respective press cavity and preferably along a line intersecting the axes of the press cavities.

In another embodiment of the invention, the center column is rearwardly offset from the plane through the axes of the press cavities whereas the outer columns are forwardly offset from such plane. Each outer column at the front of the press than may be used as a mount for a tire loader associated with the respective press cavity. Also in such embodiment, the actuators for each press cavity are located at opposite ends of a diameter of the press cavity and preferably with one closely adjacent the center column and the other closely adjacent the respective outer column.

Further in accordance with the invention, roller guide assemblies are provided to maintain each upper cavity part, during vertical movement thereof, centered to and parallel to the respective lower cavity part. The roller guide assemblies include a vertical rail on each column and plural rollers on the upper cavity part for engaging, respectively, two opposite sides and a third side of each rail. The third sides of the rails are diametrically opposed in relation to the respective upper cavity part, and respective diametrically aligned rollers are yieldingly urged by spring elements into engagement with such third sides in opposite diametral directions. The diametrically aligned rollers are loaded by the spring elements to a force which exceeds normal loads acting on the upper cavity part to eliminate slack and accurately maintain the upper cavity part concentric with the axial centerline of the lower cavity part during operation of the press. The spring elements, however, yield to compensate for thermal expansion and contraction of the upper cavity part as occurs between open and closed positions of the upper cavity part during press operation, upon shut-down or start-up of the press, etc. As is preferred, the columns associated with each mold cavity are interconnected at their upper ends by prestressed tie bars and spacers are interposed between the upper ends of the columns to fix the spacing therebetween thereby precisely to maintain the parallelism of the vertical rails for precise guiding of the respective upper cavity part.

In one embodiment of the invention, the diametrically aligned rollers are supported for rotation in respective roller frames which are pivotally mounted to a respective side plate on the upper cavity part, and respective jacks are disposed between the free ends of the roller frames and respective cantilevered ends of the side plates. The cantilevered ends of the side plates form leaf spring elements which operate yieldingly to urge the rollers into engagement with the rails. In another embodiment of the invention, the rollers at each side of the upper cavity part are mounted to a vertical roller carriage which is attached to an adjacent side plate on the upper cavity part by fasteners such as bolts. Interposed between the carriage and side plate at one side of the upper cavity part are spring elements preferably in the form of a stack of Belleville washers which urge the carriage radially outwardly in relation to the upper cavity part. The attachment bolts may be tightened to obtain clearance between the diametrically aligned rollers and respective tracks for press assembly and then backed off with the spring elements urging the carriage radially outwardly to load the diametrically aligned rollers thereon against the tracks at a force which exceeds normal loading. In either embodiment, the spring elements operate to maintain concentricity of the upper cavity part while yielding to compensate for thermal expansion and contraction of the upper cavity part over its diameter aligned with the vertical rails.

The foregoing and other features and advantages of the present invention are hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 3 is an enlarged upper lefthand portion of FIG. 2 showing details of a roller guide assembly employed in the press;

FIG. 4 is an enlarged fragmentary sectional view taken substantially along the line 4—4 of FIG. 3;

FIG. 5 is an enlarged fragmentary part sectional, part elevational view, taken substantially along the line 5—5 of FIG. 1, showing details of a bayonet ring mount employed in the press;

FIG. 7 is an enlarged partial elevational view of the press of FIG. 6 looking generally in the direction of the arrows 7—7 thereof;

FIG. 8 is an enlarged fragmentary sectional view taken substantially along the line 8—8 of FIG. 7;

FIG. 9 is an elevational view looking generally in the direction of the arrows 9—9 of FIG. 8.

DETAILED DESCRIPTION

The Embodiment of FIGS. 1-5

Figure 1:
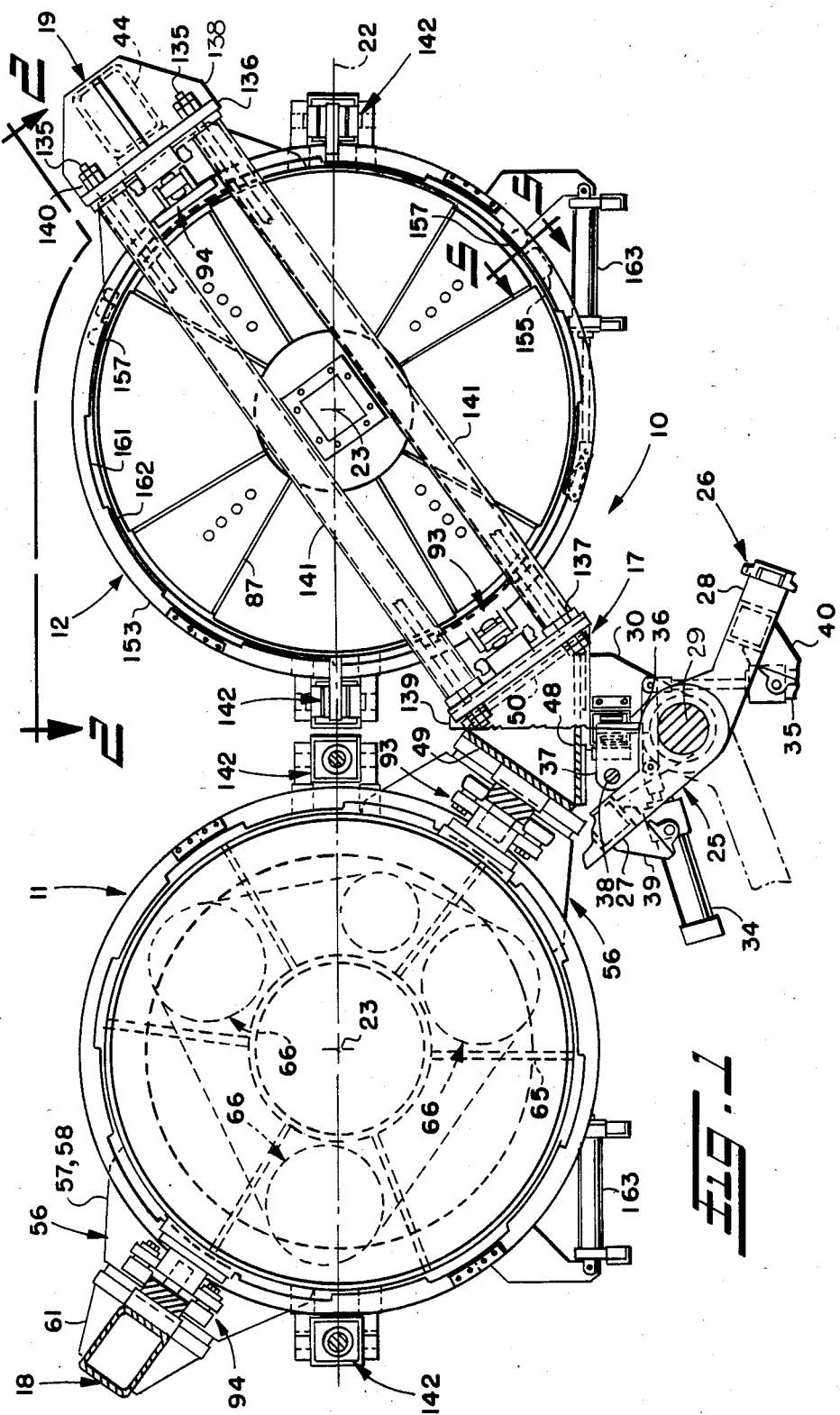
FIG. 1 is a top plan view, partly broken away in section, of a dual cavity tire curing press in accordance with the present invention.
Figure 2:
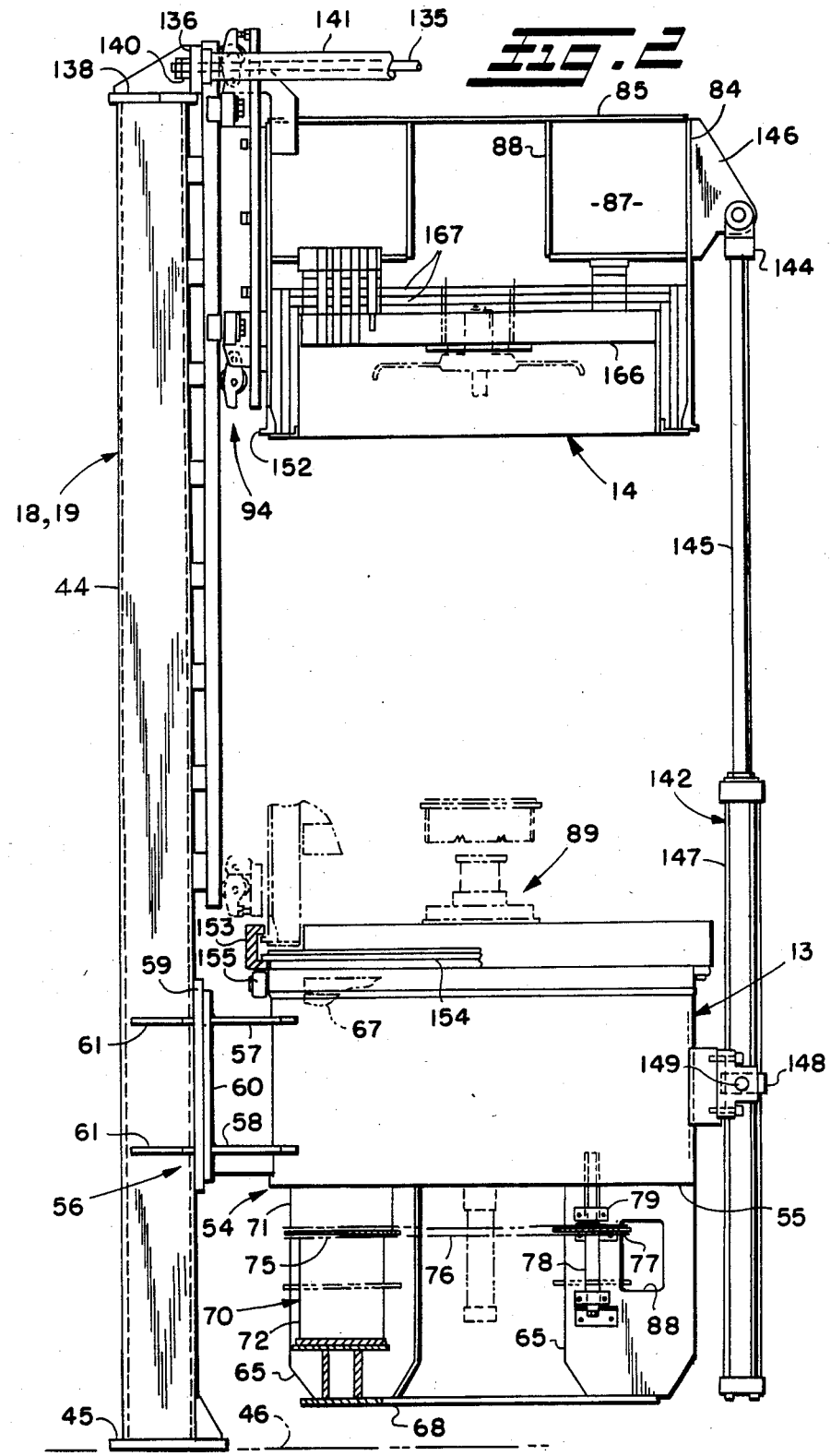
FIG. 2 is a partial rear elevational view, partly broken away in section, of the press looking generally in the direction of the arrows 2—2 of FIG. 1.

Referring initially to FIGS. 1 and 2, a dual cavity tire curing press according to the present invention is designated generally by reference numeral 10. The press 10 includes two side-by-side cavities (cavity part assemblies indicated) generally at 11 and 12. Each cavity 11, 12 includes a lower cavity part 13 and an upper cavity part 14. The upper cavity part 14 moves vertically to and from the lower cavity part 13 respectively to close and open the press. The press embodiment illustrated in FIGS. 1 and 2, and further in FIGS. 3-5, has particular application in the manufacture of passenger vehicle tires which have bead diameters generally ranging between 13 to 16 inches.

Each cavity 11, 12 of the press 10 is located between a center column 17 and a respective outer column 18, 19. The center support column 17 and the two outer support columns 18 and 19 respectively are located at the apex and ends of an imaginary shallow V. In relation to each press cavity, the center column and respective outer column are in diametric opposition and straddle the cavity. That is, the center and outer columns are located at opposite ends of a diameter of the respective cavity which diameter coincides with a respective leg of the shallow V.

In the illustrated preferred embodiment, the center column 17 is forwardly offset from the vertical center plane 22 through the vertical center axes 23 of the press cavities. Consequently, the outer columns 18 and 19 are rearwardly offset from such center plane 22 preferably by an amount approximately equal the forward offset of the center column 17. Also, the spacing between each outer column 18, 19 and the center column 17 preferably is approximately equal that of the other. As best seen in FIG. 1, the left and right sides of the press are for the most part a mirror image of each other.

The center column 17, located at the front of the press, serves as a convenient mount for loader assemblies 25 and 26. The loader assemblies 25 and 26 are used to load green tires into respective press cavities 11 and 12 from pick-up positions in front of the press cavities. The loader assemblies 25 and 26 are of the swing-arm type and include respective loader arms 27 and 28. The loader arms 27 and 28 are sleeve-mounted on a common, vertically extending cylindrical post 29 for vertical movement and also horizontal swinging movement. The post 29 is secured top and bottom to the front side of the center column 17 by upper and lower brackets, only the latter being seen at 30 in FIG. 1. Although not shown, each loader arm may support beneath its distal end a loader chuck or basket for engaging and holding a green tire for transfer into the press.

The loader arms 27 and 28 are independently pivoted about the post 29 by respective piston-cylinder assemblies 34 and 35. The loader arms are also moved vertically in tandem along the post 29 by a vertically oriented piston-cylinder assembly 36. The piston-cylinder assembly 36 is connected between the lower bracket 30 and a horizontal plate 37 to which the loader arms are connected for common vertical movement. The plate 37 is mounted for vertical sliding movement on the pivot post 29. The plate 37 also slides on a guide rod 38 which prevents pivoting of the plate about the pivot post 29. The plate 37 also serves as an anchor for the rod ends of the piston-cylinder assemblies 34 and 35 which have their cylinder ends mounted by respective brackets 39 and 40 to the respective loader arms 27 and 28. Accordingly, extension and retraction of the piston-cylinder assemblies 34 and 35 will swing the loader arms 27 and 28 outwardly and inwardly. Also, extension and retraction of the piston-cylinder assembly 36 will raise and lower the loader arms.

The above indicated columns 17-19 constitute the main skeletal structure or frame of the press. In the illustrated embodiment, the outer columns 18 and 19 are of like construction, each including a tubular post 44 of generally rectangular cross-section. As seen at the left in FIG. 2, each post is mounted by a footer 45 on the floor 46 for vertical plumbness.

The center column 17 is a fabricated tubular construction including three elongated, flat plates 48-50 joined together along their adjacent vertical edges as by welding to give the center column a triangular cross-sectional shape. The outer plate 48 to which the loader assemblies are mounted preferably is parallel to the plane 22 through the center axes 23 of the press cavities whereas the other two or inner plates 49 and 50 are perpendicular to respective legs of the V-arrangement of the columns 17-19. That is, each inner side plate is perpendicular to the diameter of the relatively adjacent press cavity with which the center column and respective outer column are aligned. Although not shown, the center column also is provided with a footer for mounting on the floor.

The center column 17 and each outer column 18, 19 support therebetween a base 54 which forms the lower cavity part 13 of the respective press cavity 11, 12. The base 54 includes a cylindrical wall 55 secured between the center column and respective outer column by diametrically opposed mounts 56. Each mount 56 includes a pair of vertically spaced apart plates 57 and 58 which have a trapezoidal-like shape with the base of the trapezoid extending arcuately for welded securement to the outside of the cylindrical wall 55. The side of the trapezoid opposite the curved base is secured by vertical mounting plates 59 and 60 to the respective column and, at the outer columns, triangular gussets 61 are provided to rigidify the sides of the mounting plates projecting laterally beyond the post 44.

In addition to the cylindrical wall 55, the base 54 further includes an inner framework including radially extending, vertical plates 65 which are cicumferentially spaced apart to accommodate hydraulic clamps 66 positioned beneath the lower mold platen 67 for operation in the manner described in the above mentioned U.S. Pat. No. 4,332,536. In the illustrated embodiment, three such hydraulic clamps 66 are provided and each may include a relatively short stroke hydraulic piston-cylinder assembly which may be mounted between the vertically movable lower mold platen 67 and a bottom frame plate 68 secured to the lower ends of the frame plates 65 which extend below the cylindrical wall 55 of the base. The piston-cylinders are located interiorly of and thus hidden from view by respective mold height adjustment devices 70. Each adjustment device 70 includes an upper cylindrical can 71 threaded onto a lower cylindrical can 72 for telescoping movement of the former when rotated relative to the latter. The lower can 72 is supported on the bottom frame plate 68 and the upper can 71 serves to engage the underside of the lower mold platen 67 to limit downward movement thereof. It will be appreciated that the upward stroke of the hydraulic clamping assemblies will be limited by the mold thicknesses employed while the return stroke will be limited by the position of the upper can 71. Accordingly, the height of the upper can may be adjusted to provide a desired limited stroke of the hydraulic clamping assemblies for different mold heights.

Each upper can 71 is provided with a sprocket 75 and a drive chain 76 extends around each sprocket and a drive sprocket 77 for rotating the upper cans uniformly vertically to adjust the same. The drive sprocket 77 is mounted to a drive shaft 78 mounted to one of the vertical frame plates 65, and the upper end portion of the shaft 78 is threaded in a mounting collar 79 so that upon rotation of the shaft, the drive spocket moves vertically with the sprockets on the upper cans between the illustrated solid line and phantom line positions. At an appropriate position, each vertical frame plate is provided with an aperture 80 to accommodate the path of the drive chain 76 extending around the sprockets.

The center column 17 and each outer column 18, 19 also support therebetween a cylindrical shell 84 which forms the upper cavity part 14 of the respective press cavity 11, 12. The cylindrical shell 84 is provided with a cover plate 85 closing the top thereof and a bolster plate 86 about midway along its axis. Above the bolster plate 86 there are provided a plurality of gusset plates 87 which radiate from an inner cylinder 88. The inner cylinder 88 coincides with a hole in the center of the bolster plate and provides an interior open space which accommodates, when the press is closed, the upper end of a center mechanism 89 centrally mounted in the base 54. The gusset plates 87 are secured to the outer shell, the inner cylinder, the cover plate and the bolster plate to form a rigid top structure.

The upper cavity part 14 of each press cavity 11, 12 is accurately guided for vertical movement by a pair of diametrically opposed roller guide assemblies 93 and 94 respectively located inwardly of the center column 17 and respective outer column 18, 19. In the illustrated embodiment, the roller guide assemblies 93 and 94 are essentially identical, although oppositely disposed, whereby the following reference to a part or parts of any one will be equally applicable to corresponding parts of the others.

As best seen in FIGS. 3 and 4, the roller guide assembly 94 includes a vertical rail 96 secured by spacer blocks 97 to the inner side of the respective column 18, 19. Each rail 96 is parallel to the other, is generally rectangular in cross-sectional shape, and has its minor axis extending radially with respect to the respective press cavity.

The roller guide assembly 94 also includes upper and lower roller assemblies 98 and 99 which are secured to an upper cavity side plate 100 at vertically spaced apart positions. The side plate 100 is secured tangentially to the cylindrical shell 84 by an adaptor plate 101 having an outer planar face engaging the side plate and an arcuate inner face engaging the curved outer surface of the cylindrical shell. As best seen in FIG. 3, upper and lower end portions 102 and 103 of the side plate respectively project vertically above and below the adaptor plate in cantilever-like fashion to form respective leaf spring elements for a purpose that will become apparent below.

As seen in FIGS. 3 and 4, the lower roller assembly 99 includes a pair of transversely spaced apart, vertical clevis plates 104 and 105 which are secured to and project generally radially outwardly from the side plate 100 in transversely spaced, parallel relationship. Mounted to the transversely outer sides of such plates 104 and 105 are respective bearing mounts 106 and 107 for rollers 108 and 109 which ride on respective opposite sides of the rail 96. Also provided is a roller 110 which rides on the radially inner side of the rail 96. The roller 110 is mounted in a roller frame 111 which is connected at its upper end by a pin 112 to and between the clevis plates 104 and 105 for pivotal swinging movement about an axis parallel to the radially inner side surface of the rail. At its lower end, the roller frame 111 has an arm 114 in which an adjustment jack 115 is threaded. The adjustment jack 115 projects radially inwardly from the roller frame for engagement with an abutment 116 secured to the distal end of the cantilevered lower end portion 103 of the side plate 100.

The adjustment jack 115 may be adjustably extended by turning the same to urge the free end of the roller frame 111 radially outwardly away from the side plate 100 to urge the roller 110 against the radially inner side of the rail 96. Once initial contact of the roller is made, further extension of the adjustment jack will cause the cantilevered end portion 103 of the side plate to flex radially inwardly thereby to provide a biasing force serving to hold the roller yieldably, albeit stiffly, in rolling engagement with the rail. Maximum flexing of the cantilevered end portion 103 may be limited by a stop plate 120 fixed to the cylindrical shell 84 as shown.

The upper roller assembly 98 is essentially identical to the lower roller assembly 99 but oppositely disposed in a vertical direction. Accordingly, the upper roller assembly 98 includes a pair of transversely spaced apart rollers 124 which ride on respective opposite sides of the rail 96 and a third roller 125 which is yieldably urged against the radially inner side of the rail by means of an adjustment jack 126 and the cantilevered upper end portion 102 of the side plate 100. As seen at the top of FIG. 3, the adjustment jack 126 may be threaded into the upper end portion 102 at its distal end and an abutment 127 may be provided on the free end of the roller frame 128 for the roller 125. Also provided is a stop plate 129 secured at its lower end to the cylindrical shell 84 with its upper end projecting above the shell to serve as an abutment which limits radially inward flexing of the cantilevered upper end portion 102 of the side plate 100.

As will be appreciated, the roller assemblies 98 and 99 at both sides of each upper cavity part 14 coact with the rails 96 to maintain the upper cavity part, during vertical movement thereof, centered and parallel to the respectve lower cavity part 13. More particularly, the rollers 108, 109, 124 which ride on respective opposite sides of the rails cooperate to prevent transverse shifting of the upper cavity part relative to its diameter extending in line with the center column 17 and respective outer column 18, 19. Also, such rollers cooperate to prevent cocking of the upper cavity part about such aligned diameter. On the other hand, the other rollers 110, 125 of such assemblies which are urged into engagement with the inner sides of the rails cooperate (a) to maintain the upper cavity part centered to the lower cavity part in a direction parallel to such aligned diameter and (b) to preclude cocking of the upper cavity part about its diameter normal to such aligned diameter. As is preferred, the rollers 110, 125 are loaded by the cantilevered end portions 102, 103 to a force which exceeds normal transverse loads acting on the upper cavity part, such as loads tending to cock the upper cavity part during raising or lowering thereof, to eliminate slack and maintain the upper cavity part concentric with the axial centerline of the lower cavity part. The cantilevered end portions, however, can yield to compensate for thermal expansion and contraction of the upper cavity part as occurs between open and closed positions thereof during press operation, upon shut-down or start-up of the press, etc.

To prevent the upper ends of the columns from flexing away from each other because of loads applied thereto, which may result in a loss of parallelism of the rails 96, the top end of the center column 17 is connected to each outer column 18, 19 by a respective pair of tie rods 135 as seen in FIGS. 1 and 2. The tie rods 135 are horizontally spaced apart in parallel relationship and each tie rod has opposite threaded ends which extend through respective holes in vertical plates 136 and 137 secured to the top ends of the columns at top plates 138 and 139, respectively. Nuts 140 are threaded onto the ends of the tie rods and tightened to tension the rods. As is preferred, the nuts are tightened to forceably hold the vertical plates against respective ends of spacer tubes 141 through which the tie rods pass, thereby to precisely determine and fix the spacing between the top ends of the columns. In this manner, precise parallelism of the guide rails 96 is obtained and maintained.

With reference to FIGS. 1 and 2, vertical movement of the upper cavity part 14 of each press cavity 11, 12 is effected by a pair of vertically oriented, relatively long-stroke piston-cylinder lifting assemblies 142. The piston-cylinder assemblies 142 for each press cavity preferably are aligned with those for the other cavity; accordingly, the piston-cylinder assemblies for both cavities are arranged along a line through the center axes 23 of the cavities.

As shown, the clevis 144 on the end of the rod 145 of each piston-cylinder assembly 142 is connected to an eye bracket 146 mounted to the adjacent side of the cylindrical shell 84 of the respective upper cavity part 13. The piston-cylinder assembly is supported at its cylinder 147 by a collar 148 on trunnions 149 which are mounted to the adjacent side of the cylindrical wall 55 of the base 54. As should be apparent, extension and retraction of the piston-cylinder assemblies for each cavity respectively will raise and lower the respective upper cavity part between its solid and phantom line positions shown in FIG. 2.

When lowered to its phantom line position in FIG. 2, a radially projecting annular flange 152 at the lower end of the cylindrical shell 84 interfits with a two-part bayonet locking ring 153 which is journaled on a horizontally extending flange or lip 154 of the base 54 by means of rollers 155 circumferentially spaced around the base. As best seen in FIG. 5, the ring is generally C-shaped in cross-section and has its lower leg 156 projecting beneath the lip 154 at the top end of the base. The lower leg rides for rotational movement on the rollers 155 mounted to the side of the base with the axes of such rollers extending horizontally and radially with respect to the base. The ring may also have dependently mounted thereto the circumferentially arranged rollers seen in broken lines at 157 which ride on the O.D. of the cylindrical base wall 54.

The upper leg 160 of the lock ring 153 is formed with alternating notches and teeth seen respectively at 161 and 162 in FIG. 1. The radially projecting flange 152 at the lower end of the cylindrical shell 84 is also formed with alternating teeth and notches with the teeth being designed to fit vertically through the notches 161 in the open position of the lock ring and to lie beneath the teeth 162 of the lock ring when the ring is rotated to a closed position. When the press is open, the lock ring will be in its open position as achieved by piston-cylinder assemblies 163 mounted immediately subjacent the ring. With the ring in the open position, and the respective upper cavity part descending, the teeth of the flange will pass through the notches in the upper leg of the ring coming to rest at approximately the position seen in FIG. 5 with the teeth of the flange 152 being positioned in the groove 164 of the ring. When the cavity is in the position seen in FIGS. 2 and 5, the piston-cylinder assembly 163 is extended to rotate the ring to move the teeth of the upper leg above the teeth of the flange thereby mechanically locking the upper cavity part to the bottom cavity part.

When the press closes and is mechanically locked, the lower and upper cavity parts 13 and 14 of each press cavity 11, 12 will be joined to form a single cavity or chamber in which is situated the fixed upper mold platen 166 and the vertically movable lower mold platen 67. The upper platen may be insulated from the bolster plate 86 by insulation plates 167. Also, the lower platen 67 may be surrounded both below and at the sides with insulating material.

Once mechanically locked, the hydraulic clamps 66 may be operated to close upper and lower mold parts, respectively secured to theupper and lower plates 166 and 67, under considerable pressure to resist expansion forces occurring within the tire during bladder shaping and cure. As the hydraulic clamps come up to full clamp pressure, the reaction is through the upper cavity part back via the lock ring to the base. Accordingly, the lifting assemblies 142 are not required to resist the clamping force.

The Embodiment of FIGS. 6-10

Figure 6:
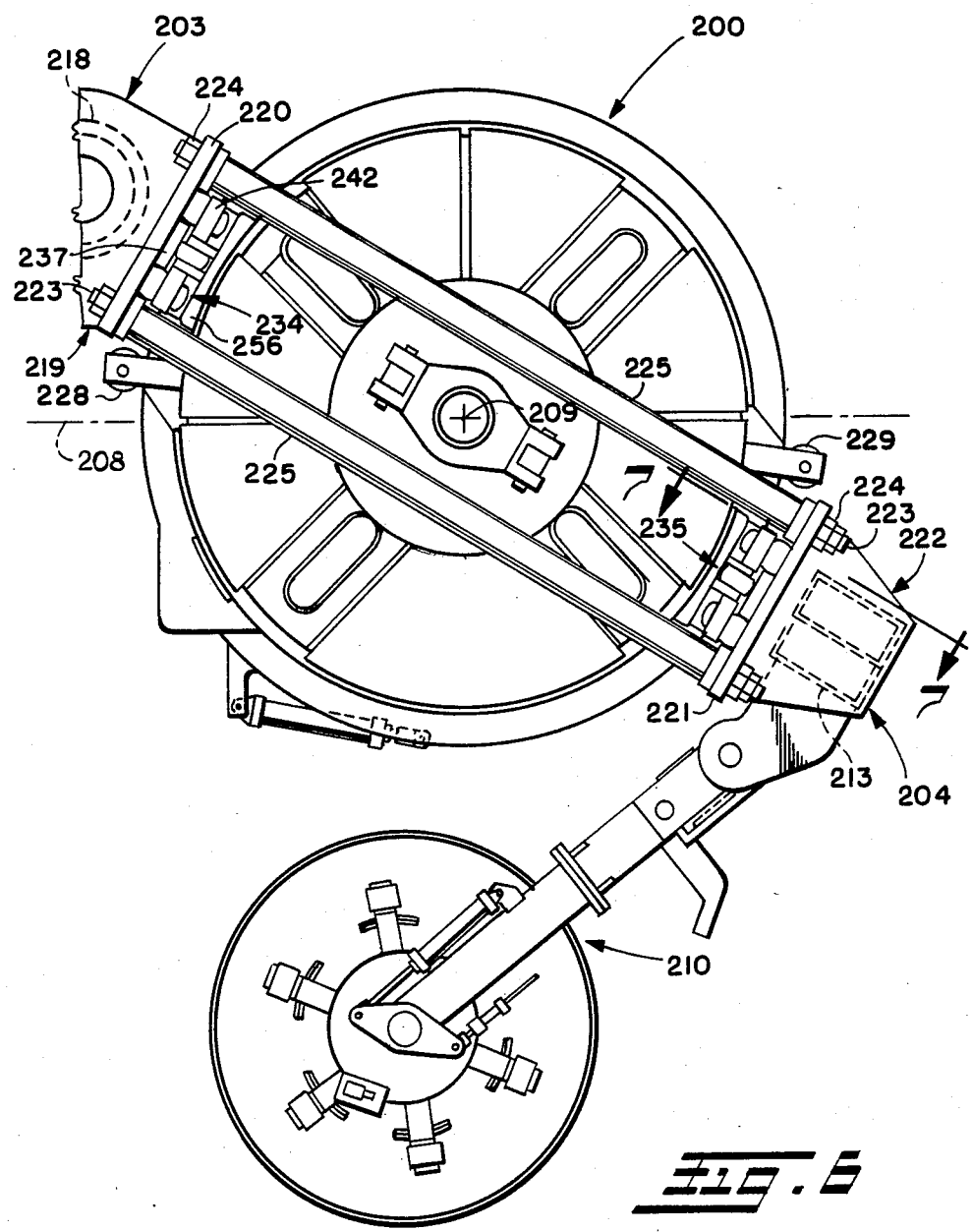
FIG. 6 is a fragmentary plan view of the righthand half of another dual cavity tire curing press according to the invention.

Referring now to FIGS. 6 and 7, the righthand half of another dual cavity tire curing press embodiment according to the invention is indicated generally at 200. The lefthand of the press is not being shown inasmuch as it is a mirror image of the illustrated righthand half of the press. Accordingly, the following description of the righthand half of the press will be equally applicable to the lefthand half of the press. It also is noted that the press embodiment illustrated in FIGS. 6 and 7 and further in FIGS. 8-10 has particular application in the manufacture of truck tires.

Each press cavity 200 includes a lower cavity part 201 and an upper cavity part 202. The upper cavity part 202 moves vertically to and from the lower cavity part 201 respectively to close and open the press. Each press cavity is located between a center column 203 and a respective outer column 204. Like the press embodiment shown in FIG. 1, the center column and outer columns respectively are located at the apex and ends of an imaginary shallow V, and the center column and each outer column are in diametric opposition in relation to the respective cavity.

In the FIG. 6 embodiment, the center column 203 is rearwardly offset from the vertical center plane 208 intersecting the vertical center axis 209 of each press cavity. Consequently, each outer column 204 of the press is forwardly offset from such center plane 208 preferably by an amount approximately equal the rearward offset of the center column 203. Also, the spacing between each outer column 204 and the center column 203 preferably is approximately equal that of the other.

Each outer column 204, located at the front of the press, serves as a convenient mount for a loader assembly 210 for the respective press cavity. Each loader assembly 210 operates independently of the other to load green tires into the respective press cavity from pick-up positions in front of the press cavity. Each loader assembly 210 may be of the swingarm type similar, for example, to the loader assembly shown in Singh et al U.S. Pat. No. 4,338,069.

Each outer column 204 includes a post 213 of generally rectangular cross-section. As seen in FIG. 7, the post may be mounted at its lower end to a base 214 which forms the lower cavity part 201 of the respective press cavity 200. The base 214 includes a cylindrical wall 215 which houses hydraulic clamps in the manner described in the above mentioned U.S. Pat. No. 4,332,536.

The center column 203 includes a cylindrical tubular post 218 which may be mounted at its lower end to and between the lower cavity parts 201. Secured to the top end of the post 218 is a plate assembly 219. The plate assembly 219 includes a vertical plate 220 for each press cavity 200 diametrically opposed to a vertical plate 221 in a plate assembly 222 secured to the top end of the respective outer column 204. Tie rods 223, which are horizontally spaced apart in parallel relationship, have opposite threaded ends which extend through respective holes in the vertical plates 220 and 221. Nuts 224 are threaded onto the ends of the tie rods and tightened to tension the rods thereby to forcibly hold the vertical plates 220 and 221 against respective ends of spacer tubes 225 through which the tie rods pass. In this manner, the spacing between the top ends of the inner and outer columns is precisely determined and fixed.

At their upper portions, the center column 203 and outer column 204 support therebetween the upper cavity part 202 of the respective press cavity 200. The upper cavity part 202, including a cylindrical shell 230, may be generally as described in the above mentioned U.S. Pat. No. 4,332,536. Reference also may be had to such patent for details respecting a mechanical lock which operates to hold the upper cavity part to the lower cavity part when the press is closed. Vertical movement of the upper cavity part is effected by a pair of vertically oriented, relatively long-stroke piston-cylinder lifting assemblies 228 and 229. The piston-cylinder assemblies preferably are located at opposite ends of a diameter of the press cavity and preferably with one closely adjacent the center column and the other closely adjacent the outer column as shown in FIG. 6.

The upper cavity part 202 of each press cavity 200 is accurately guided for vertical movement by a pair of diametrically opposed roller guide assemblies 234 and 235 respectively located inwardly of the center column 203 and respective outer column 204. The roller guide assemblies 234 and 235 are for the most part identical, although oppositely disposed, whereby the following reference to a part or parts of the roller guide assembly 235 will be equally applicable to corresponding parts of the roller guide assembly 234 unless otherwise indicated.

As best seen in FIGS. 7-10, the roller guide assembly 235 includes a vertical rail 237 secured by a spacer plate 238 to the inner side of the outer column 213. The rail 237 is parallel to the corresponding rail of the other roller guide assembly 234 which is mounted to the inner side of the center column 203. The rail 237 is generally rectangular in cross-sectional shape and has it minor axis extending radially with respect to the press cavity.

The roller guide assembly 235 also includes upper and lower roller assemblies 240 and 241 which are secured to the laterally enlarged upper and lower ends of an I-shape vertical plate-like roller carriage 242, respectively. The upper roller assembly includes a pair of rollers 243 and 244 which are mounted to the roller carriage in transversely spaced apart relationship to ride on respective opposite sides of the rail 237. The upper roller assembly 240 also includes a roller 245 which rides on the radially inner side of the rail 237. The roller 245 is mounted in a clevis 246 formed at the upper end of the roller carriage 242 for rotation about a horizontal axis parallel to the radially inner side surface of the rail. The lower roller assembly 241 similarly includes a pair of rollers 247 and 248 mounted to the lower end portion of the roller carriage 242 in transversely spaced apart relationship to ride on respective opposite sides of the rail 237. The lower roller assembly also includes another roller 249 which rides on the radially inner side of the rail, such roller being mounted in a clevis 250 formed at the lower end of the roller carriage 242.

The roller carriage 242 is attached by dowels 254 and bolts 255 to a side plate 256 which is secured tangentially to the cylindrical shell 230 of the upper cavity part 202 as by welding. Such side plate has an outer planar face and an arcuate inner face engaging the curved outer surface of the cylindrical shell as best seen in FIG. 8.

The dowels 254, which are vertically spaced apart, extend radially with respect to the upper cavity part and have their radially inner ends anchored in the side plate 256. The radially outer ends of the dowels project from the side plate into respective bores in the roller carriage 242. The bores and dowels are relatively sized to permit translating movement of the roller carriage 242 in a radial direction while maintaining the vertical axis of the roller carriage parallel to the rail 237. As seen in FIG. 9, the upper dowel is transversely centered between the rollers 243 and 244 of the upper roller assembly whereas the lower dowel is transversely centered between the rollers 247 and 248 of the lower roller assembly 241.

As further seen in FIG. 9, the bolts 255 are arranged in two vertically spaced apart pairs of bolts with the bolts in each pair being transversely spaced apart generally in vertical alignment with the rotational axes of respective rollers 243, 244, 247, 248. That is, four such bolts are provided in a rectangular arrangement symmetric with the rectangular arrangement of the rollers 243, 244, 247 and 248.

Figure 10:
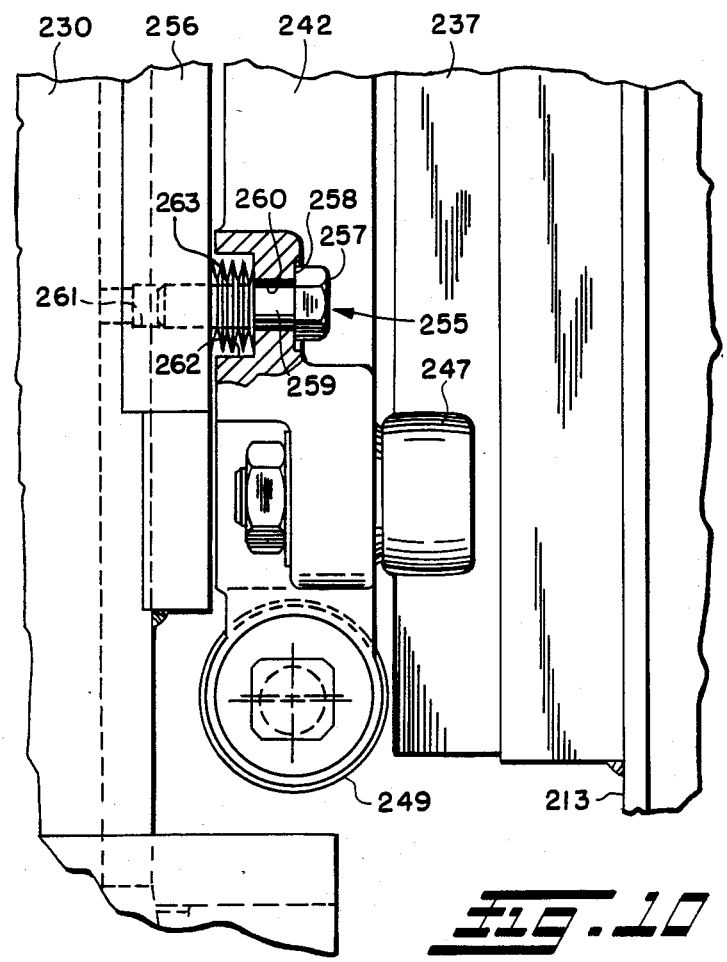
FIG. 10 is an enlarged elevational view looking generally in the direction of the arrows 10—10 of FIG. 9.

As best seen in FIG. 10, each bolt 255 has a head 257 which engages the bottom of a shallow counterbore 258 provided at the radially outer side of the roller carriage 242. Each bolt also has a threaded shank 259 which extends through a slightly oversized hole 260 in the roller carriage 242 and into a correspondingly threaded bore 261 in the side plate 256. The roller carriage 242 at its radially inner side also includes a counterbore 262 concentric with the hole 260 which accommodates a stack of Belleville washers 263 through which the shank of the bolt centrally passes. The stack of Belleville washers 263 is compressed between the outer surface of the side plate and bottom surface of the counterbore 262 to exert a large force acting to urge the roller carriage 242 radially outwardly.

As will be appreciated, each bolt 255 may be tightend to draw the roller carriage 242 radially inwardly and into engagement with the outer surface of the side plate 256 against the biasing force of the Belleville washers 263 to provide clearance between the rollers 245 and 249 and the radially inner side of the rail 237 to facilitate assembly of the upper cavity part between the center and outer columns 203 and 204. The bolts may then be backed off wherepon the Belleville washers will urge the roller carriage 242 radially outwardly to bring the rollers 245 and 249 into engagement with the radially inner side of the rail under a load applied by the Belleville washers. The rollers 245 and 249 preferably are loaded against the rail by the Belleville washers to a force which exceeds loads normally acting on the upper cavity part during operation as when the upper cavity is moved vertically to open or close the press. That is, the rollers are loaded to eliminate slack during operation of the press to maintain concentricity of the upper and lower cavity parts. On the other hand, the Belleville washers will yield to compensate for thermal expansion of the upper cavity part.

As above indicated, the roller guide assembly 234 diametrically opposite the above described roller guide assembly 235 is of substantially the same construction. It is preferred, however, that the roller carriage 242 of the roller guide assembly 234 be held fixedly to, e.g., against, the adjacent side plate 256 by the associated bolts which eliminates the need for Belleville washers in the roller guide assembly 234. This provides for more stable vertical translating movement of the upper cavity part, it being noted that the Belleville washers in the roller guide assembly 235 will act through the upper cavity part to urge the rollers 245 and 249 of the roller guide assembly 234 into loaded engagement with the radially inner side of the respective rail 237 mounted to the center column.

As will be appreciated, the roller guide assemblies 234 and 235 at both sides of the upper cavity part 202 coact with the rails 237 to maintain the upper cavity part, during vertical movement thereof, centered and parallel to the respective lower cavity part 201. More particularly, the rollers 243, 244, 247, 248 which ride on respective opposite sides of the rails cooperate to prevent transverse shifting of the upper cavity part relative to its diameter extending in line with the center column 203 and respective outer column 204. Also, such rollers cooperate to prevent cocking of the upper cavity part about such aligned diameter. On the other hand, the other rollers 245, 249 of such assemblies which are loaded against the inner sides of the rails cooperate to maintain the upper cavity part centered to the lower cavity part in a direction parallel to such aligned diameter and to preclude cocking of the upper cavity part about its diameter normal to such aligned diameter.

In view of the foregoing, it it believed apparent that the invention provides tire presses of significantly reduced cost, maintenance, and energy consumption, while providing for high tire quality.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A tire curing press comprising a center column and two outer columns respectively located at the apex and ends of a shallow V; a pair of cavity part assemblies each located between said center column and a respective outer column, said cavity part assemblies each including a lower cavity part and an upper cavity part, the latter being supported by and between said center column and respective outer column for vertical movement; actuating means for raising and lowering said upper cavity parts in order to open and close said cavity part assemblies; and guide means associated with respective sides of at least one of said upper cavity parts and respectively disposed for cooperation with the center column and respective outer column for guiding vertical movement of the upper cavity part.

2. A press as set forth in claim 1, wherein each actuator includes a piston-cylinder assembly.

3. A press as set forth in claim 1, wherein the lower cavity part of each cavity part assembly is mounted to and between the center column and respective outer column.

4. A press as set forth in claim 1, further comprising respective means interconnecting the upper end of each outer column to the upper end of said center column.

5. A press as set forth in claim 4, wherein said means interconnecting includes at least one prestressed tie bar.

6. A press as set forth in claim 1, further comprising respective spacer means extending between the upper ends of said center column and each outer column to maintain a fixed spacing therebetween.

7. A press as set forth in claim 1, wherein said center column is located at the front of the press, and further comprising loader means for each tire cavity commonly mounted to said center column.

8. A press as set forth in claim 1, wherein said outer columns are located at the front of the press, and further comprising loader means for each cavity part assembly mounted to a respective outer column.

9. A press as set forth in claim 1, further comprising bayonet lock means for locking the upper and lower cavity parts together when closed, said bayonet lock means including a locking ring of C-shape cross section and a plurality of circumferentially arranged rollers mounted to said lower cavity part for supporting said locking ring for rotation, said locking ring having a bottom flange axially trapped between said rollers and an outwardly projecting annular lip on said lower cavity part.

10. A press as set forth in claim 1, wherein said center column and said outer columns are offset from the plane through the axes of said cavity part assemblies in opposite directions.

11. A press as set forth in claim 10, wherein said center column and each outer column are located at respective opposite ends of a diameter of the respective cavity part assembly.

12. A press as set forth in claim 1, wherein said actuating means includes a pair of actuators for each cavity part assembly which are located at opposite ends of a diameter of the respective cavity part assembly.

13. A press as set forth in claim 3, wherein the actuators for both tire cavities are arranged along a line intersecting the axes of said cavity part assemblies.

14. A press as set forth in claim 1, wherein each said guide means includes a roller guide means associated with the respective column for guiding the respective upper cavity part.

15. A press as set forth in claim 11, wherein each roller guide means includes a vertical rail on said center column, a vertical rail on the respective outer column, and roller means on the upper cavity part for rollingly engaging said vertical rails.

16. A press as set forth in claim 15, wherein said roller means further includes at least two transversely spaced apart rollers at each vertical rail for rollingly engaging respective opposite sides of the respective vertical rail.

17. A press as set forth in claim 16, wherein there are two rollers engaging each opposite side of each vertical rail at vertically spaced apart points.

18. A press as set forth in claim 15, wherein said vertical rails are diametrically aligned in relation to the respective upper cavity part, and said roller means includes diametrically aligned rollers and means for urging said rollers in opposite diametral directions into engagement with said vertical rails.

19. A press as set forth in claim 18, wherein said rollers are supported for rotation in respective roller frames, said roller frames are mounted to said upper cavity part for diametral movement relative to the upper cavity part, and said means for urging includes respective jack means acting on said roller frames to urge the rollers into engagement with respective rails.

20. A press as set forth in claim 18, wherein said means for urging includes means yielding to accommodate thermal expansion and contraction of said upper cavity part.

21. A press as set forth in claim 18, wherein said diametrically aligned rollers include two diametrically opposed pairs of vertically spaced apart rollers, and said means for urging is operative to urge the rollers of each pair into engagement with the respective vertical rail at vertically spaced apart points.

22. A press as set forth in claim 21, wherein the rollers of one of said pairs of vertically spaced apart rollers are mounted to a carriage for movement therewith, and further comprising means for mounting said carriage to an adjacent side of said upper cavity part for guided movement in such opposite diametral directions, and spring means interposed between said carriage and adjacent side of said upper cavity part for urging said carriage radially outwardly to load said rollers of said one of said pairs against the adjacent rail at vertically spaced apart points.

23. A tire curing press comprising a cavity part assembly including a lower cavity part and an upper cavity part, a of columns straddling said cavity part generally at respective diametrically opposite sides thereof, actuating means for raising and lowering said upper cavity part to open and close said tire cavity, and roller guide means for guiding vertical movement of said upper cavity part, said roller guide means including a vertical rail on each column and plural rollers on the upper cavity part for engaging, respectively, two opposite sides and a third side of each rail to maintain the upper cavity part during vertical movement thereof centered to and parallel to said lower cavity part.

24. A press as set forth in claim 33, wherein the lower cavity part of each cavity part assembly is mounted to and between the columns.

25. A press as set forth in claim 23, wherein said plural rollers include at least two transversely spaced apart rollers at each vertical rail for rollingly engaging respective opposite sides of the respective vertical rail.

26. A press as set forth in claim 25, wherein there are two rollers engaging each opposite side of each vertical rail at vertically spaced apart points.

27. A press as set forth in claim 23, further comprising respective means interconnecting the upper ends of said columns.

28. A press as set forth in claim 27, wherein said means interconnecting includes at least one prestressed tie bar.

29. A press as set forth in claim 28, further comprising respective spacer means extending between the upper ends of said columns to maintain a fixed spacing therebetween.

30. A press as set forth in claim 23, wherein said third side of said rails are diametrically opposed in relation to the upper cavity part, and further comprising means for urging respective ones of said diametrically aligned rollers into engagement with respective rails in opposite diametral directions.

31. A press as set forth in claim 30, wherein said means for urging, includes means yielding to accommodate thermal expansion and contraction of said upper cavity part.

32. A press as set forth in claim 30, wherein said diametrically aligned rollers include two diametrically opposed pairs of vertically spaced apart rollers, and said means for urging is operative to urge the rollers of each pair into engagement with the third side of the respective rail at vertically spaced apart points.

33. A press as set forth in claim 32, wherein the rollers of one of said pairs of vertically spaced apart rollers are mounted to a carriage for movement therewith, and further comprising means for mounting said carriage to an adjacent side of said upper cavity part for guided movement in such opposite diametral directions, and spring means interposed between said carriage and adjacent side of said upper cavity part for urging said carriage radially outwardly to load said rollers of said one of said pairs against the adjacent rail at vertically spaced apart points.

34. A press as set forth in claim 33, wherein said plural rollers include at least two transversely spaced apart rollers mounted to said carriage for rollingly engaging respective opposite sides of the adjacent vertical rail.

35. A press as set forth in claim 33, wherein said spring means includes a stack of Belleville washers.

36. A press as set forth in claim 35, further comprising fastener means for drawing the carriage radially inwardly against the spring force to provide clearance between said rollers of said one of said pairs and the adjacent rail.

37. A press as set forth in claim 32, wherein said diametrically opposed rollers are supported for rotation in respective roller frames, said roller frames are mounted to said upper cavity part for diametral movement relative to the upper cavity part, and said means for urging includes respective jack means for urging the rollers into engagement with respective rails.

38. A press as set forth in claim 37, wherein said jack means are interposed between the respective roller frames and respective resiliently yieldable supports on said upper cavity part.

39. A press as set forth in claim 31, wherein said yieldable supports include respective cantilevered ends of vertical plates mounted to said upper cavity part.

* * * * *